US008733649B2

United States Patent
Cai et al.

(10) Patent No.: US 8,733,649 B2
(45) Date of Patent: May 27, 2014

(54) DATA MATRIX DECODING CHIP AND DECODING METHOD THEREOF

(75) Inventors: Qiang Cai, Fuzhou (CN); Wenchuan Chen, Fuzhou (CN); Yousen Qiu, Fuzhou (CN); Tao Yang, Fuzhou (CN)

(73) Assignee: Fujian Newland Computer Co., Ltd., Fuzhou (CN)

( * ) Notice: Subject to any disclaimer, the term of this patent is extended or adjusted under 35 U.S.C. 154(b) by 253 days.

(21) Appl. No.: 13/149,846

(22) Filed: May 31, 2011

(65) Prior Publication Data
US 2011/0290880 A1    Dec. 1, 2011

(30) Foreign Application Priority Data
Jun. 1, 2010 (CN) .......................... 2010 1 0188974

(51) Int. Cl.
*G06K 5/00* (2006.01)
*G06K 7/00* (2006.01)
*G06K 7/10* (2006.01)

(52) U.S. Cl.
USPC ... 235/437; 235/435; 235/462.1; 235/462.11; 235/454

(58) Field of Classification Search
USPC .................. 235/435, 437, 462.1, 462.11, 454
See application file for complete search history.

(56) References Cited

U.S. PATENT DOCUMENTS

| 2004/0026508 A1* | 2/2004 | Nakajima et al. ............. 235/454 |
| 2006/0118632 A1* | 6/2006 | Joseph et al. ............. 235/462.1 |
| 2009/0078772 A1* | 3/2009 | Ofek et al. ............. 235/462.04 |
| 2009/0230193 A1* | 9/2009 | Al-Hussein et al. ..... 235/462.11 |

* cited by examiner

*Primary Examiner* — Michael G Lee
*Assistant Examiner* — Laura Gudorf
(74) *Attorney, Agent, or Firm* — Novak Druce Connolly Bove + Quigg LLP

(57) ABSTRACT

An exemplary Data Matrix barcode decoding chip, comprising: a characteristic searching unit configured for searching for a characteristic pattern in the barcode image to determine pixel coordinates of the characteristic pattern; a barcode parameter acquiring unit configured for acquiring a barcode parameter according to the pixel coordinates of the characteristic pattern; a correction characteristic acquiring unit configured for searching for a characteristic position in the barcode image and acquiring a correction characteristic according to the characteristic position; a module information processing unit configured for calculating a grayscale value corresponding to a module according to the barcode parameter and the correction characteristic; a binarizing unit configured for binarizing the module; a codeword extracting unit configured for extracting a codeword according to the binarized module; and an error correction and decoding unit configured for decoding the codeword.

17 Claims, 4 Drawing Sheets

DATA MATRIX DECODING CHIP AND DECODING METHOD THEREOF

CROSS-REFERENCE TO RELATED PATENT APPLICATIONS

This application claims the benefit, pursuant to 35 U.S.C. §119(a), of P.R. China Patent Application No. 201010188974.9, filed on Jun. 1, 2010, entitled "Data Matrix Decoding Chip and Decoding Method Thereof" by Qiang Cai, Wenchuan Chen, Yousen Qiu and Tao Yang, the disclosure for which is hereby incorporated herein in its entirety by reference.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present disclosure generally relates to the technical field of barcode identification, and more particularly, to a Data Matrix barcode decoding chip and a decoding method thereof.

BACKGROUND OF THE INVENTION

Conventionally, in a process of decoding a matrix-type two-dimensional barcode, a photographic device is used to take a picture of the barcode so as to get a barcode image, and then processes such as denoising, grayscale extraction, adaptive brightness equalization, binarization, codeword extraction and decoding are carried out on the barcode image. However, in the prior 2D barcode identifying method described above, the adaptive brightness equalization and the binarization of the barcode image are carried out on each of the pixels respectively. Therefore, the grayscale of each of the pixels must be adjusted and then compared with a grayscale threshold. This represents a great computational burden and lowers the speed of the system.

In view of the shortcomings of the prior art, what are needed, therefore, are a matrix-type two-dimensional barcode decoding chip and a decoding method thereof which can ensure quick and successful execution of a decoding process.

BRIEF DESCRIPTION OF THE DRAWINGS

The components in the drawings are not necessarily drawn to scale, the emphasis instead being placed upon clearly illustrating the principles of at least one embodiment of the present disclosure. In the drawings, like reference numerals designate corresponding parts throughout various views, and all the views are schematic.

DETAILED DESCRIPTION OF THE INVENTION

Figure 1:
FIG. 1 is a schematic view of barcode symbol patterns of Data Matrix barcode according to the present disclosure.

To facilitate better understanding of the present disclosure by those skilled in the art, the following terms related to barcodes are provided for reference. Some of the barcode terms are from the National Standard GB/T 12905-2000 of the People's Republic of China, and are not intended to limit the present disclosure.

Barcode symbol: a combination of bars or blanks or a combination of modules representing information defined by a certain kind of barcode.

Codeword: a codeword represents an intermediate value occurring when a source data is transformed into a barcode symbol. The number of codewords in a symbol determines the number of all symbols in the barcode symbol.

Data codeword: a data codeword represents a value of a data symbol.

Error correction codeword: an error correction codeword represents a value of an error correction symbol.

Module: as the smallest independent unit in a Data Matrix barcode, a module represents a bit of binary data.

Functional pattern: a kind of specific pattern in a Data Matrix barcode symbol for symbol positioning and characteristic identification, including detection patterns, positioning patterns, correction patterns and the like.

Detection pattern: a kind of special pattern in a Data Matrix barcode symbol pattern for symbol positioning in a barcode image; also termed as a position detection pattern.

Positioning pattern: a kind of pattern in a Data Matrix barcode symbol pattern for determining pixel coordinates of a module in the symbol.

Correction pattern: a kind of fixed reference pattern in a Data Matrix barcode symbol pattern for determining a position of a symbol. In case a certain extent of distortion or stain exists in a barcode image, the correction pattern can be used to correct pixel coordinates of a module in the barcode image.

Coding region: a region in the Data Matrix barcode symbol pattern that is unoccupied by any functional pattern. The coding region is used to encode data and error correction codewords and represent data symbols and error correction symbols.

Version: a sequence representing specifications of a Data Matrix barcode symbol, which reflects a symbol size, the number of modules in the symbol and arrangement of modules in the symbol.

Version information: a kind of functional pattern in a Data Matrix barcode symbol pattern for determining a version No. of a matrix-type 3D barcode symbol.

Format: representing an error correction level and a mask pattern used by a Data Matrix barcode symbol.

Format information: a kind of functional pattern in a Data Matrix barcode symbol pattern for determining an error correction level and a mask pattern used by a Data Matrix barcode symbol.

Mask pattern: a mask pattern is used for an XOR operation on a bit map in the coding region for purpose to equalize the ratio of dark-colored modules and light-colored modules in the symbol and reduce occurrence of patterns that might influence the processing of the barcode image.

Binarized barcode image: a grayscale barcode image is processed by using a global threshold or a local threshold to obtain a binarized barcode image with only a dark color and a light color.

Threshold: a threshold is a boundary value that separates two inspection levels from each other, and a value of the threshold per se is a lower limit of the upper level.

Module error: a module error means that, in a binarized barcode image, dark and light color statuses of a module are inverse to the design.

Pixel: a unit in a barcode image that corresponds to a single photosensitive unit in a photosensitive array (e.g., a CCD or CMOS device). A pixel is generally considered as the minimum integral unit of the barcode image. A digital barcode image is generally stored in the unit of pixels, and a pixel is a unit having the minimum area in the digital barcode image.

Figure 2:
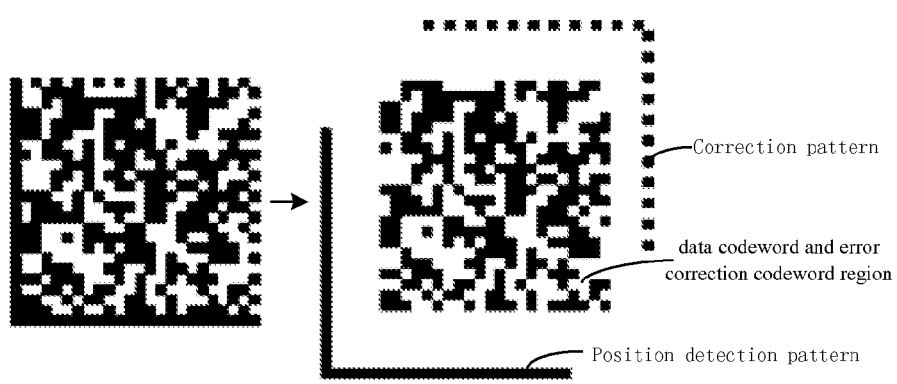
FIG. 2 is schematic view illustrating functions of the barcode symbol patterns of the Data Matrix barcode according to the present disclosure.

FIG. 1 is a schematic view of barcode symbol patterns of Data Matrix barcode according to the present disclosure. FIG. 2 is schematic views illustrating functions of the barcode symbol patterns of the Data Matrix barcode according to the present disclosure. To make it easier for those skilled in the art to understand the present disclosure, a brief description will be made on the Data Matrix barcode with reference to FIGS. 1 to 2 hereinafter.

The Data Matrix code is also termed as a data matrix code, and there are two kinds of Data Matrix codes: ECC000-140 and ECC200. ECC000-140 adopts a convolution code error correction scheme, while ECC200 adopts a Reed-Solomon algorithm error correction scheme. Currently, most researches and applications related to Data Matrix codes focus on the ECC 200 Matrix codes, and there are only a few applications of ECC000-140. Functional patterns of the Data Matrix code include position detection patterns and correction patterns. The coding region includes a version information and format information region that represents the symbol information, and a data codeword and error correction codeword region. The symbol encoding of the ECC 200 Data Matrix code doesn't adopt any mask pattern and error correction thereof is associated with the way in which the modules are arranged, so the coding region of the ECC200 Data Matrix code has no region representing the symbol information but only has a data codeword and error correction codeword region. According to the detected pixel coordinates of modules of the ECC200 Data Matrix code, the module parameters (including the size of modules, the number of rows, the number of columns and the like) and the error correction level of the ECC200 Data Matrix code can be determined.

Figure 3:
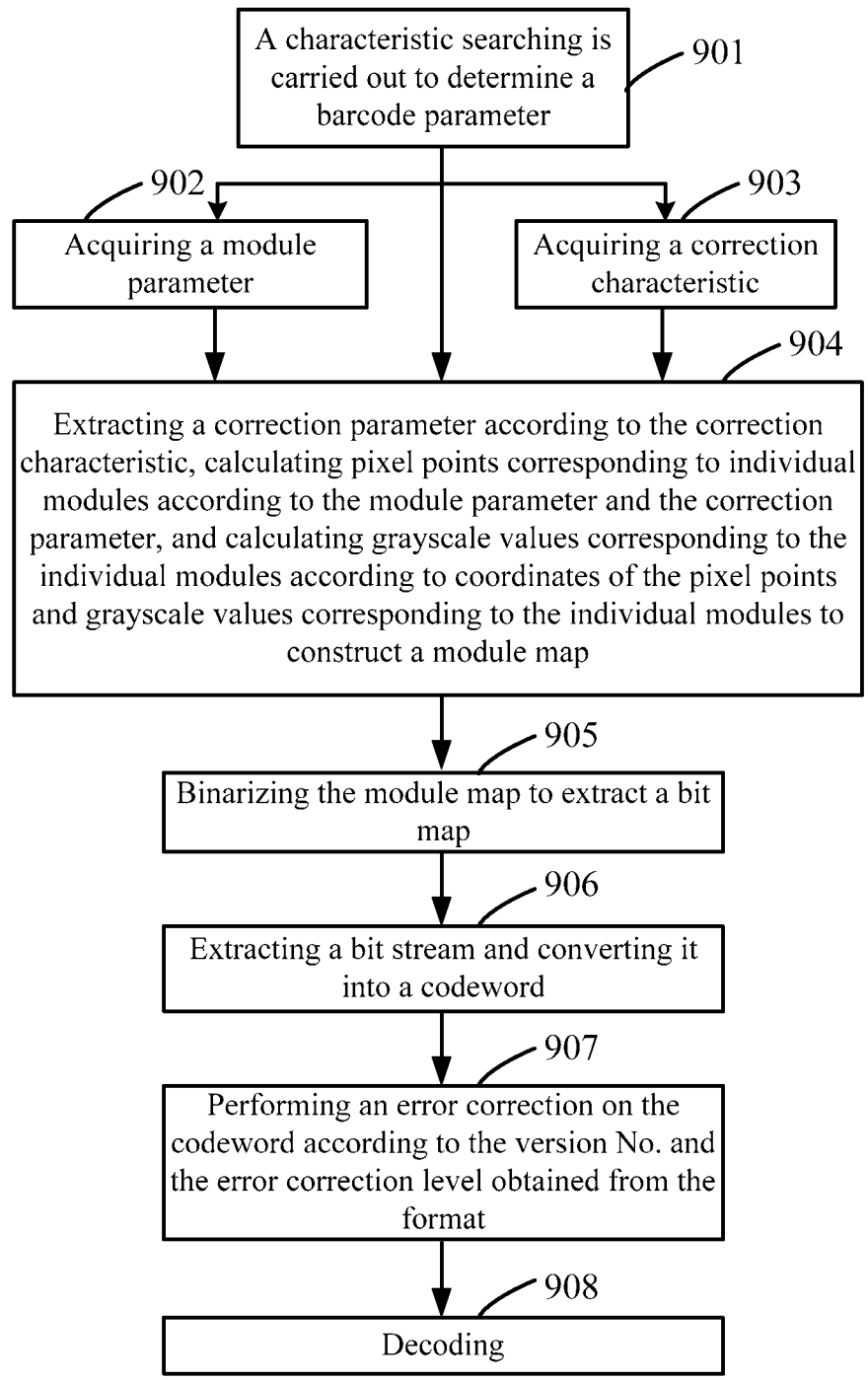
FIG. 3 is a flowchart of a decoding method for a Data Matrix barcode decoding chip according to an embodiment of the present disclosure.

The position detection pattern of the Data Matrix code is a region having a width of one module that is located at an edge of the data region. The left side and the bottom side of the Data Matrix code, which are dark-colored solid lines, form an L-shaped boundary that is primarily used for determining physical dimensions of the barcode (i.e., the barcode region), positioning and distortion correction. The two sides opposite to the L-shaped boundary, which are correction patterns consisting of dark-colored and light-colored modules alternately arranged in a width of one module, are primarily used for defining module coordinates of the barcode and for distortion correction, but may also assist in determining the physical size of the barcode. [0051] As shown in FIG. 3, in a step 901, a characteristic searching is carried out in the barcode image to determine pixel coordinates of functional patterns, and barcode parameters are calculated according to the pixel coordinates of the functional patterns and a module dimension ratio. The barcode parameters include a barcode region, a barcode direction or barcode module dimensions, module coordinates and etc. In an implementation of the present disclosure, this step may be accomplished by detecting functional patterns, particularly position detection patterns or correction patterns, through template matching. In another implementation of the present disclosure, this step may also be accomplished through scale detection, which includes: detecting boundary points between dark-colored and light-colored modules in the barcode image through scanning; comparing a spacing relationship of the boundary points between the dark-colored and light-colored modules with a module dimension scale of the position detecting patterns or correction patterns; and determining pixel coordinates of the characteristic pattern in the barcode image according to the comparison result.

For the Data Matrix code, approaches to determine the pixel coordinates of the position detection patterns (the L-shaped boundary) include template matching, cross scanning and the like. In the barcode image, because combinations of some modules may also present an L-shaped pattern similar to the L-shaped boundary, a plurality of matching positions of L-shaped patterns may be obtained in the characteristic searching process. Therefore, a determination must be made according to relative relationships between the L-shaped boundary and the blank region to exclude invalid L-shaped patterns. Furthermore, the present disclosure also provides a method of identifying a Data Matrix barcode through row and column line detection, which method includes the following steps of: extracting a plurality of black-white boundary line segments of a predetermined length within a predetermined region of the barcode image; forming a plurality of straight lines from the plurality of black-white boundary line segments; grouping the plurality of straight lines into a row parallel line group and a column parallel line group according to characteristics of parallel lines; identifying a type of the Data Matrix barcode by making a determination on a grid formed by the row parallel line group and the column parallel line group according to characteristics of the Data Matrix barcode; acquiring the pixel coordinates of the characteristic pattern of the grid formed by the row parallel line group and the column parallel line group, and acquiring a barcode parameter according to pixel coordinates of the characteristic pattern.

In a step 902, a correction pattern is searched in the barcode image according to the pixel coordinates of the position detection patterns and the barcode parameters detected. For example, the correction pattern is a track line (as termed as a railway line). Then, pixel coordinates of a central point and/or marginal points of the correction pattern (i.e., pixel coordinates of the track line) are obtained in order to obtain a correction characteristic.

In a step 903, a characteristic pattern, e.g., a corner point of the barcode image, a position detection pattern, a correction pattern, a positioning pattern, a dynamic characteristic template, a scribing characteristic template or the like, is searched in the barcode image. Then, correction characteristics including, for example, pixel coordinates and a grayscale value of the correction point, are obtained according to the characteristic pattern.

In a step 904, module coordinates corresponding to the correction characteristic are calculated according to the correction characteristic, the module parameter and the barcode parameter, and a correction parameter is calculated according to the pixel coordinates and the module coordinates of the correction characteristic. The correction parameter reflects the mapping relationship between the pixel points of the barcode image and the barcode modules. Then, pixel points corresponding to individual modules are calculated according to the module parameter and the correction parameter, and grayscale values corresponding to the individual modules are calculated according to the coordinates and grayscale values of the pixel points corresponding to the individual modules to construct a module map.

For the Data Matrix code, the module parameter and the correction parameter are extracted according to the correction characteristic in the following ways: module spacing of the Data Matrix code are calculated according to pixel coordinates of central points of a plurality of modules in the track line; module dimensions are obtained; the number of module rows and columns of the Data Matrix code are obtained according to the barcode parameter and the module dimensions; and then the module parameter is obtained. Then, the module coordinates of the track line are calculated according to the module parameter, and the correction parameter is calculated according to the pixel coordinates of central points and module coordinates of a plurality of modules in the track line. The correction parameter reflects a mapping relationship between the pixel points and the barcode modules in the barcode image. Thereafter, pixel points corresponding to individual modules are calculated according to the module parameter and the correction parameter, and grayscale values corresponding to the individual modules are calculated according to the coordinates and the grayscale values of the pixel points corresponding to the modules to construct a module map.[0064] It is possible that the barcode is distorted during the printing and imaging processes to make modules corresponding to different regions in the barcode unequal in width. Because the track line of the Data Matrix code consists of dark-colored and light-colored modules alternately arranged and having a width of a single module and extends through the horizontal direction and the vertical direction of the barcode, variations in width of the dark-colored and light-colored modules in the track line just reflect the distortions of the Data Matrix code. Therefore, by calculating the width of each module according to the track line, distortions of the barcode can be effectively prevented.

In a step 905, the module map is binarized to extract a bit map.

In a step 906, according to the mask pattern obtained in the step 902, a de-masking operation (e.g., an XOR operation) is carried out on the bit map to remove the mask and restore a bit stream representing a data codeword and an error correction codeword. If no mask pattern is used when the barcode symbol is encoded, then this step can be omitted.

In a step 907, according to the arrangement rules of Data Matrix barcode, the bit stream is extracted and converted into the data codeword and the error correction codeword. For a Data Matrix code, the bit stream is extracted and converted into the data codeword and the error correction codeword according to the arrangement rules of Data Matrix codes.

In a step 908, according to the version No. and the error correction level obtained in the step 902, the data codeword and the error correction codeword are re-arranged in terms of blocks, and error detection and error correction operations are performed thereon to correct deletion errors and unknown errors until the maximum error correction capacity defined by the version No. and the error correction level is reached. Then, a data block sequence is re-assembled to restore a data bit stream representing the Data Matrix barcode information.

Figure 4:
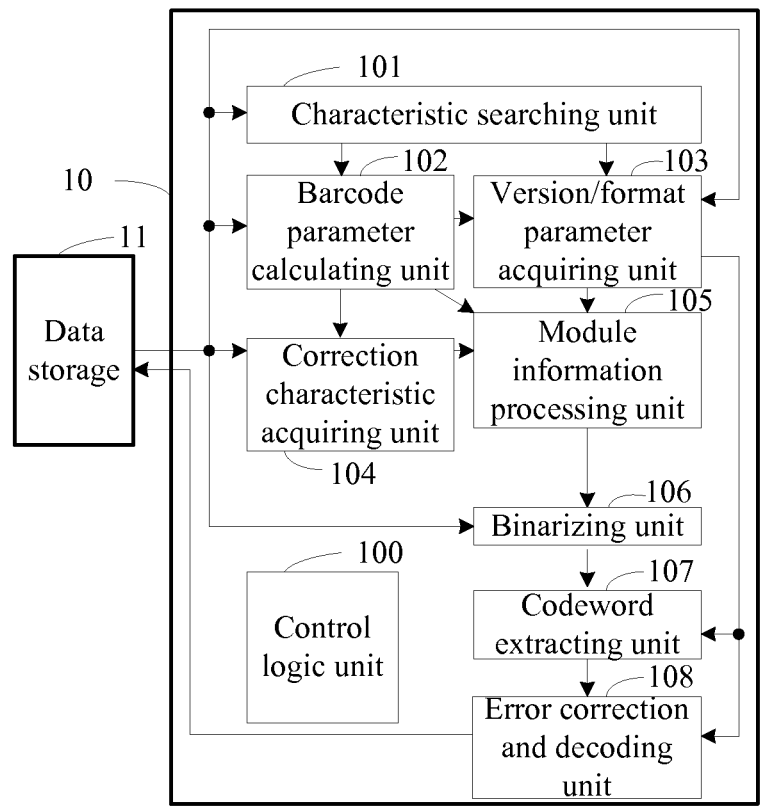
FIG. 4 is a schematic structural view of a Data Matrix barcode decoding chip according to an embodiment of the present disclosure.

Hereinafter, the Data Matrix barcode decoding chip according to the present disclosure will be detailed. FIG. 4 is a schematic structural view of a Data Matrix barcode decoding chip according to an embodiment of the present disclosure.

As shown in FIG. 4, the data storage 11 stores a barcode image, and the Data Matrix barcode decoding chip 10 identifies and decodes the barcode image stored in the data storage 11. The Data Matrix barcode decoding chip 10 includes a control logic unit 100, a characteristic searching unit 101, a barcode parameter acquiring unit 102, a version/format parameter acquiring unit 103, a correction characteristic acquiring unit 104, a module information processing unit 105, a binarizing unit 106, a codeword extracting unit 107 and an error correction and decoding unit 108.

The control logic unit 100 is configured to control the operation statuses and processing flows of the characteristic searching unit 101, the barcode parameter acquiring unit 102, the version/format parameter acquiring unit 103, the correction characteristic acquiring unit 104, the module information processing unit 105, the binarizing unit 106, the codeword extracting unit 107 and the error correction and decoding unit 108. The control logic unit 100 performs the controlling operations in the form of a finite state machine. A finite state machine is also termed as a finite state automatic machine or just briefly termed as a state machine, and is a state logic representing a finite number of states as well as transitions and actions between these states. The control logic unit 100 may be implemented by programmable logic devices, programmable logic controllers, logic gates and triggers. In a preferred embodiment, the control logic unit 100 includes a register, a combined logic for determining state transitions and a combined logic for determining an output of a state control module. The register is configured for storing state variables.

The characteristic searching unit 101 determines pixel coordinates of characteristic patterns in the barcode image by searching for the characteristic pattern in the barcode image. The characteristic patterns include but are not limited to functional patterns of the barcode, such as position detection patterns, correction patterns, positioning patterns and the like. In a preferred embodiment, the characteristic searching unit 101 searches for position detection patterns through template matching; specifically, a position detection pattern detecting template is generated according to a module dimension ratio of the position detection patterns. Then, the position detection pattern detecting template is translated relative to the barcode image and a grayscale matching operation is performed thereon to determine an optimal matching position between the position detection pattern detecting template and the barcode image, and pixel coordinates of central points or marginal points of the position detection patterns in the barcode image are determined according to the optimal matching position. In the Data Matrix code, because combinations of some modules may also present an L-shaped pattern similar to the L-shaped boundary, a plurality of matching positions of L-shaped patterns may be obtained by the characteristic searching unit 101. Therefore, a determination must be made according to relative relationships between the L-shaped boundary and the blank region to exclude invalid L-shaped patterns. In another embodiment of the present disclosure, the characteristic searching unit 101 may also determine pixel coordinates of the characteristic patterns in the barcode image through scale detection, which includes: detecting boundary points between dark-colored and light-colored modules in the barcode image through scanning; comparing a spacing relationship of the boundary points between the dark-colored and light-colored modules with a module dimension scale of the position detecting patterns or correction patterns; and determining pixel coordinates of the characteristic pattern in the barcode image according to the comparison result. Furthermore, the present disclosure also provides an embodiment of identifying a Data Matrix barcode through row and column line detection, which includes the following steps executed by the characteristic searching unit 101: extracting a plurality of black-white boundary line segments of a predetermined length within a predetermined region of the barcode image; forming a plurality of straight lines from the plurality of black-white boundary line segments; grouping the plurality of straight lines into a row parallel line group and a column parallel line group according to characteristics of parallel lines; identifying a type of the Data Matrix barcode by making a determination on a grid formed by the row parallel line group and the column parallel line group according to characteristics of the Data Matrix barcode; and acquiring the pixel coordinates of the characteristic pattern of the grid formed by the row parallel line group and the column parallel line group.

The barcode parameter acquiring unit 102 calculates a barcode parameter (e.g., a barcode direction, a barcode region, and etc.) according to pixel coordinates of the functional pattern detected by the characteristic searching unit 101. In the Data Matrix code, the barcode parameter acquiring unit 102 calculates module dimensions according to the pixel coordinates of the position detection patterns detected by the characteristic searching unit 101, acquires a barcode region according to a length of the L-shaped pattern of the position detection patterns, and acquires a barcode direction according to orientations of the two sides of the L-shaped pattern in the barcode image coordinate system. Further, according to the pixel coordinates of the functional patterns and the module dimension ratio of the barcode parameter acquiring unit 102, the barcode parameter acquiring unit 102 may further calculate a range of the barcode region and roughly calculate a barcode module size (i.e., a ratio of the barcode module size to the pixel width), and further estimate the module coordinates according to the range of the barcode region and the barcode module size.

The version/format parameter acquiring unit 103 extracts version information and format information from the barcode image according to the pixel coordinates of the functional patterns and the barcode parameters detected by the characteristic searching unit 101, and decodes the version information and the format information to obtain the version/format parameters. The version information and the format information of the coding region are disposed adjacent to the position detection patterns, so the version/format parameter acquiring unit 103 can search version information and format information regions according to the pixel coordinates of the position detection patterns, the barcode direction and the barcode module size, and then obtain the version/format parameters (e.g., the version No., the error correction level, the mask pattern, and etc.) through binarizing and error correction and decoding operations.

For the Data Matrix code, the correction characteristic acquiring unit 103 searches for a correction pattern in the barcode image according to the pixel coordinates of the position detection patterns detected by the characteristic searching unit 101 and the barcode parameters (including the barcode region, the barcode direction and etc.) acquired by the barcode parameter acquiring unit 102. For example, the correction pattern is a track line (as termed as a railway line).

Then, the correction characteristic acquiring unit 103 acquires pixel coordinates of central points and/or marginal points of a plurality of modules in the correction pattern (i.e., pixel coordinates of the track lines) to obtain correction characteristics.

Figure 5:
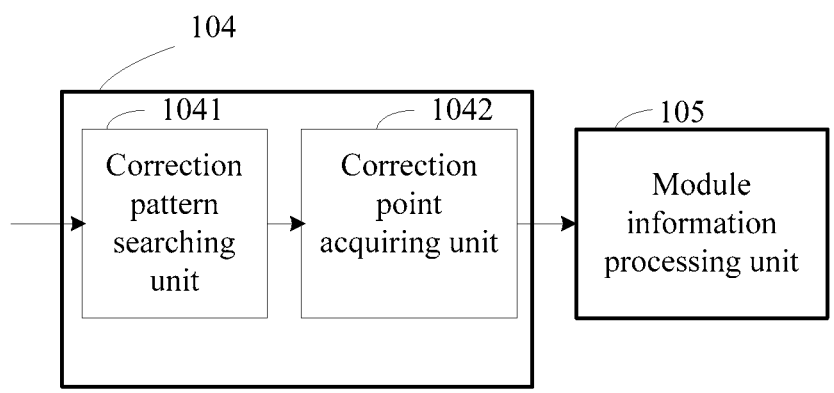
FIG. 5 is a schematic view of a first kind of correction point acquisition structure of a correction characteristic acquiring unit in a Data Matrix barcode decoding chip according to an embodiment of the present disclosure.

FIG. 5 is a schematic view of a first kind of correction point acquisition structure of a correction characteristic acquiring unit in a Data Matrix barcode decoding chip according to an embodiment of the present disclosure. As shown in FIG. 10, the correction characteristic acquiring unit 104 includes a correction pattern searching unit 1041 and a correction point acquiring unit 1042. Similar to the characteristic searching unit 101, by referring to the module dimension ratio of the correction pattern and the barcode parameter, the correction pattern searching unit 1041 generates a correction pattern detecting template according to the module dimension ratio of the correction pattern. Then, the correction pattern detecting template is translated relative to the barcode image and a grayscale matching operation is performed thereon. The correction point acquiring unit 1042 calculates similarities of the matching results to determine an optimal matching position between the correction pattern detecting template and the barcode image, and determines the pixel coordinates and grayscale values of a central point or marginal points of the correction pattern in the barcode image according to the optimal matching position.

For the Data Matrix code, the correction pattern searching unit 1041 generates a track line detecting template according to the way in which modules of the track line are arranged and on the basis of the pixel coordinates of the position detection patterns detected by the characteristic searching unit 101 and the barcode parameter acquired by the barcode parameter acquiring unit 102, translates the track line detecting template relative to the barcode image and performs a grayscale matching operation thereon. The correction point acquiring unit 1042 calculates similarities of the matching results to determine an optimal matching position between the track line detecting template and the barcode image, and determines the pixel coordinates and grayscale values of central points of a plurality of modules of the track line in the barcode image according to the optimal matching position.

The module information processing unit 105 determines the module parameter according to the version parameter, calculates module coordinates corresponding to the correction characteristics according to the correction characteristics, the module parameter and the barcode parameter, and calculates a correction parameter according to the pixel coordinates and the module coordinates of the correction characteristics. The correction parameter reflects a mapping relationship between pixel points of the barcode image and the barcode modules. Then, the module information processing unit 105 calculates pixel points corresponding to individual modules according to the module parameter and the correction parameter, and calculates grayscale values corresponding to the individual modules according to the coordinates and grayscale values of the pixel points corresponding to the individual modules so as to construct a module map.

For the Data Matrix code, the module information processing unit 104 calculates module spacings of the Data Matrix code according to pixel coordinates of central points of a plurality of modules in the track line, obtains module dimensions, determines the number of module rows and columns of the Data Matrix code according to the barcode parameter and the module dimensions, and obtains the module parameter. Then, the module coordinates of the track line are calculated according to the module parameter, and the correction parameter is calculated according to the pixel coordinates of central points and module coordinates of a plurality of modules in the track line. The correction parameter reflects a mapping relationship between the pixel points of the barcode image and the Data Matrix code modules in the barcode image. Thereafter, pixel points corresponding to individual modules are calculated according to the module parameter and the correction parameter of the Data Matrix code, and grayscale values corresponding to the individual modules are calculated according to the coordinates and grayscale values of the pixel points corresponding to the modules to construct a module map.

Figure 6:
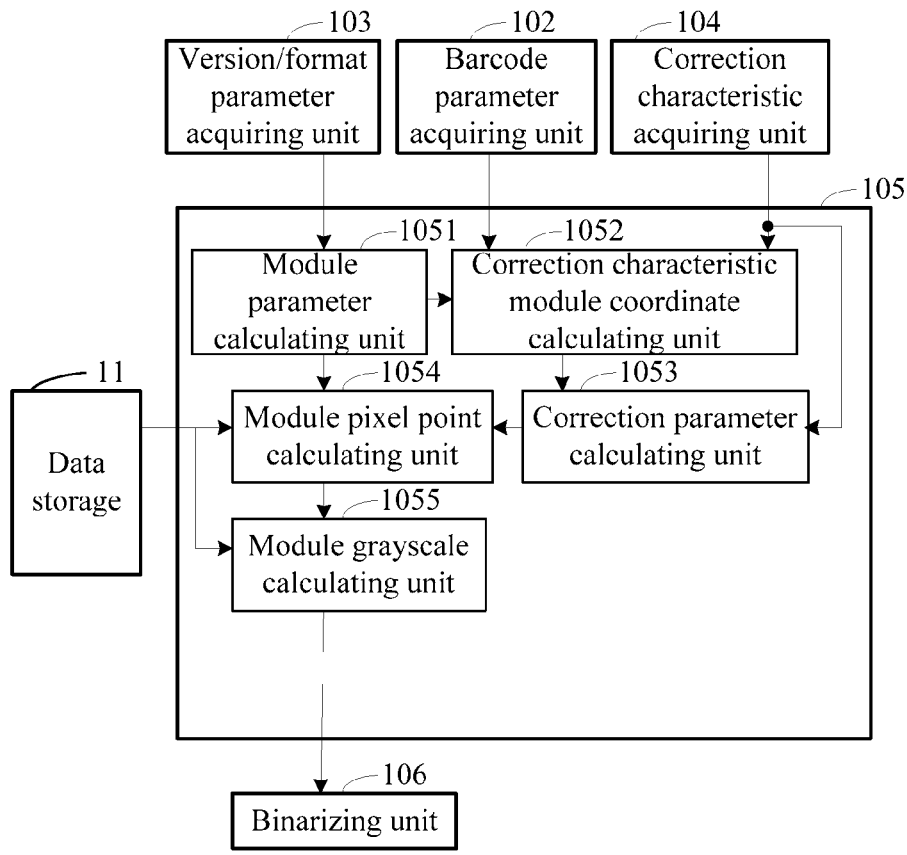
FIG. 6 is a schematic structural view of a module information processing unit in a Data Matrix barcode decoding chip according to an embodiment of the present disclosure.

FIG. 6 is a schematic structural view of a module information processing unit in a Data Matrix barcode decoding chip according to an embodiment of the present disclosure. The module information processing unit 105 includes a module parameter calculating unit 1051, a correction characteristic module coordinate calculating unit 1052, a correction parameter calculating unit 1053, a module pixel point calculating unit 1054 and a module grayscale calculating unit 1055. According to the version parameter (e.g., the version No.), the module parameter calculating unit 1051 acquires the number of rows of modules, the number of columns of modules and the number of modules corresponding to the version parameter by looking up a table or through functional calculation according to the version parameter (e.g., the version No.). The correction characteristic module coordinate calculating unit 1052 calculates relative positions of the pixel coordinates in the barcode region according to the pixel coordinates of the correction characteristics provided by the correction characteristic acquiring unit 104 and the barcode parameter, and calculates module coordinates of the correction characteristics according to the relative positions and the module parameter. The correction parameter calculating unit 1053 calculates the correction parameter according to the pixel coordinates and the module coordinates of the correction characteristic. The correction parameter reflects a mapping relationship between pixel points of the barcode image and the barcode modules. The module pixel point calculating unit 1054 calculates pixel points corresponding to individual modules according to the module parameter and the correction parameter.

For the Data Matrix code, the module parameter calculating unit 1051 calculates module spacings of the Data Matrix code according to the pixel coordinates of the central points of a plurality of modules in the track line, acquires the module size, determines the number of rows of modules and the number of columns of modules in the Data Matrix code, and then acquires the module parameter. As the error correction level of the Data Matrix code is associated with the number of rows of modules and the number of columns of modules, the error correction level of the Data Matrix code may also be determined through acquisition of the module parameter. The correction characteristic module coordinate calculating unit 1042 calculates the module coordinates of the track line according to the pixel coordinates of the track line provided by the correction characteristic acquiring unit 103 and the module parameter. The correction parameter calculating unit 1043 calculates the correction parameter according to the pixel coordinates and the module coordinates of the track line. The correction parameter reflects a mapping relationship between pixel points of the barcode image and the barcode modules. The module pixel point calculating unit 1044 calculates pixel points corresponding to individual modules according to the module parameter and the correction parameter.

The mapping between the modules and the pixel points may be implemented in various ways, including perspective transformation, quadratic polynomial, cubic polynomial, triangular grid, wavelet transformation, or a combination thereof. The modular pixel point calculating unit 1054 can calculate coordinates of corresponding pixel points according to the module coordinates, or calculate the corresponding module coordinates according to the pixel coordinates. The present disclosure has no limitation on the calculation process described above and the way in which it is accomplished. The module grayscale calculating unit 1055 calculates grayscale values corresponding to individual modules according to coordinates and grayscale values of pixel points corresponding to the individual modules to construct the module map. The grayscale values of the modules can be calculated in various ways, including statistical calculation, interpolation, averaging calculation, weighting calculation, or a combination thereof. The present disclosure has no limitation on the calculation process described above and the way in which it is accomplished.

To make it easier for those skilled in the art to understand the process made by the module information processing unit of the present disclosure, a calculation method will now be described as an example to illustrate the transformation principle of the module information processing unit of the present disclosure. However, this calculation method shall not be construed as a limitation on the module information processing unit of the present disclosure.

Figure 7:
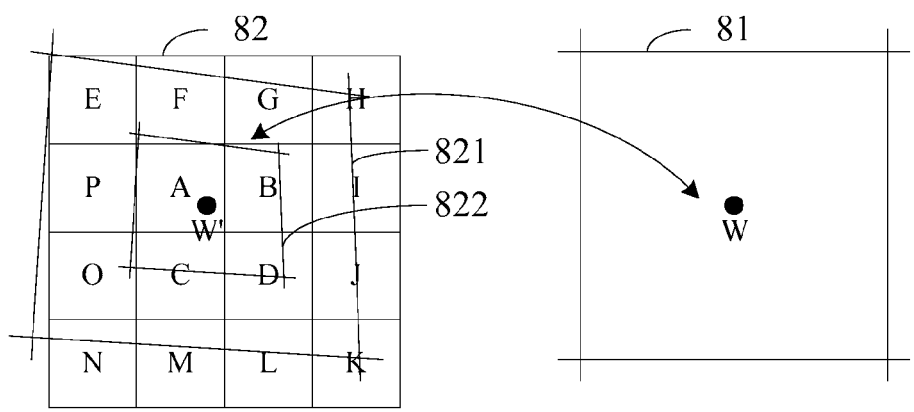
FIG. 7 is a schematic view illustrating transformation principles of a module information processing unit in a Data Matrix barcode decoding chip according to an embodiment of the present disclosure.

FIG. 7 is a schematic view illustrating transformation principles of a module information processing unit in a Data Matrix barcode decoding chip according to an embodiment of the present disclosure. There is a mapping relationship between the module 81 and the pixel region 82, and a deformation region 821 corresponds to the mapping range of the module 81 in the pixel region 82. A central point W of the module 81 is mapped to a mapping point W' in the pixel region 82. As is shown in FIG. 12, the module 81 corresponds to sixteen pixel points, i.e., the pixel points A-P, among which the pixel points A, B, C, D surround the mapping point W'. A central deformation region 822 corresponds to a mapping range of the central region of the module 81 in the pixel region 82. For the matrix-type barcode, the central region of the module reflects the value of the module most accurately. In a preferred embodiment, a grayscale value of the central point W corresponding to the mapping point W' can be calculated according to grayscale values of the four pixel points A, B, C, D. Of course, the grayscale value of the module 81 may also be calculated according to all pixel points corresponding to the pixel region 82. That is, the grayscale value of the module 81 can be calculated according to grayscale values of a number of pixel points corresponding to the module 81.

The binarizing unit 106 receives the module grayscale values calculated by the module information processing unit 105, and binarizes the module map according to a threshold to extract a bit map. The threshold may be preset, obtained through global threshold acquisition or local threshold acquisition, or obtained in other ways.

The characteristic patterns include but are not limited to functional patterns of the barcode such as position detection patterns, correction patterns, positioning patterns and the like. For ease of understanding by those skilled in the art, other forms of the characteristic patterns than the functional patterns will be illustrated hereinafter. The Data Matrix barcode is a kind of 2D barcodes, and the barcode symbol pattern thereof has characteristics of an arithmetic matrix. The barcode symbols may be considered to include a plurality of dark-colored and light-colored rectangular modules. By choosing a set of rectangular module patterns that are easy to be distinguished from adjacent ones in the barcode image region, a dynamic characteristic template can be formed. Additionally, by searching for two modules of the same color (i.e., dark-colored modules or light-colored modules) spaced apart in a same row or column of the barcode image, a scribing characteristic template can be formed.

The Data Matrix barcode decoding chip of the present disclosure is of a pipeline hardware structure, and identification and decoding of the barcode image are accomplished by hardware logics. Because the pipeline hardware structure is adapted to carry out pipeline operations and parallel processing on the barcode image, the processing speed is very high.

As compared to the typical decoding technologies for processors, the Data Matrix barcode decoding chip of the present disclosure is completely of a hardware structure without need of involvement of a processor in the decoding process. As compared to a processor, the chip structure has a more simple structure, a smaller area, lower power consumption and lower cost, and is easy to be integrated, so it is suitable for portable applications. Therefore, the present disclosure may be conveniently combined with the network of things, which provides a wider space for development of the barcode technology.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A Data Matrix barcode decoding chip, comprising:
   (a) a characteristic searching unit configured for searching for a characteristic pattern in a barcode image to determine pixel coordinates of the characteristic pattern, wherein the characteristic searching unit detects boundary points between dark-colored modules and light-colored modules in the barcode image through scanning, compares a spacing relationship between the boundary points with a module dimension scale of the characteristic pattern, and determines the pixel coordinates of the characteristic pattern in the barcode image according to the comparison result;
   (b) a barcode parameter acquiring unit configured for acquiring a barcode parameter according to the pixel coordinates of the characteristic pattern;
   (c) a correction characteristic acquiring unit configured for searching for a characteristic position in the barcode image and acquiring a correction characteristic pattern according to the characteristic position;
   (d) a module information processing unit configured for calculating a mapping relationship between pixel coordinates and module coordinates of the barcode image according to pixel coordinates of the correction characteristic pattern and module pixels of the correction characteristic pattern, and calculating a grayscale value corresponding to each module of the barcode image to construct a module map according to the mapping relationship;
   (e) a binarizing unit configured for binarizing the module map;
   (f) a codeword extracting unit configured for extracting a codeword according to the binarized module map; and
   (g) an error correction and decoding unit configured for decoding the codeword.

2. The Data Matrix barcode decoding chip of claim 1, wherein the characteristic searching unit generates a characteristic pattern detection template according to a module dimension scale of the characteristic pattern, translates the characteristic pattern detection template relative to the barcode image, executes a grayscale matching process to determine an optimal matching position between the characteristic pattern detection template and the barcode image, and determines the pixel coordinates of the characteristic pattern in the barcode image according to the optimal matching position.

3. The Data Matrix barcode decoding chip of claim 1, wherein the characteristic searching unit extracts from a predetermined region of the barcode image a plurality of black-white boundary line segments of a predetermined length, forms a plurality of straight lines from the plurality of black-white boundary line segments, groups the plurality of straight lines into a row parallel line group and a column parallel line group according to characteristics of parallel lines, identifies a type of the Data Matrix barcode by making a determination on a grid formed by the row parallel line group and the column parallel line group and according to characteristics of the Data Matrix barcode, and acquires the pixel coordinates of the characteristic pattern in the grid formed by the row parallel line group and the column parallel line group.

4. The Data Matrix barcode decoding chip of claim 1, wherein the barcode image comprises a track line, the correction characteristic acquiring unit searching for the track line in the barcode image and acquiring pixel coordinates of the track line.

5. The Data Matrix barcode decoding chip of claim 4, wherein the track line comprises dark-colored modules and light-colored module alternately arranged in a width of one module, the module information processing unit calculating the size of modules of Data Matrix barcode according to the pixel coordinates of the track line.

6. The Data Matrix barcode decoding chip of claim 5, wherein the module information processing unit obtains a module parameter according to the size of modules and the barcode parameter, the module parameter comprising the number of rows and the number of columns of the Data Matrix barcode module.

7. The Data Matrix barcode decoding chip of claim 6, wherein the module information processing unit obtains an error correction level of the Data Matrix barcode according to the module parameter.

8. The Data Matrix barcode decoding chip of claim 6, wherein the module information processing unit calculates the pixel coordinates and the module coordinates of the track line according to the module parameter.

9. The Data Matrix barcode decoding chip of claim 8, wherein, the module information processing unit calculating and acquiring the correction parameter according to the pixel coordinates and the module coordinates of the track line, the correction parameter reflecting the mapping relationship between the pixel points of the barcode image and the Data Matrix barcode module.

10. The Data Matrix barcode decoding chip of claim 9, wherein the method of obtaining the correction parameter comprise perspective transformation, quadratic polynomial, cubic polynomial, triangular grid, wavelet transformation, or a combination thereof.

11. A method for decoding a Data Matrix barcode, comprising the following steps of:
    (a) acquiring a barcode image of the Data Matrix barcode;
    (b) searching for a characteristic pattern to obtain a barcode parameter, wherein the step of searching for a characteristic pattern to obtain a barcode parameter comprises detecting boundary points between dark-colored modules and light-colored modules in the barcode image through scanning, comparing a spacing relationship between the boundary points with a module dimension scale of the characteristic pattern, and determining the pixel coordinates of the characteristic pattern in the barcode image according to the comparison result;

(c) searching for a correction characteristic pattern and acquiring pixel coordinates of the correction characteristic pattern;

(d) calculating module coordinates of the correction characteristic pattern according to the barcode parameter, a module parameter, and the pixel coordinates of the correction characteristic pattern;

(e) calculating a mapping relationship between pixel coordinates and module coordinates of the barcode image according to the pixel coordinates of the correction characteristic pattern and the module pixels of the correction characteristic pattern;

(f) calculating a module grayscale value corresponding to each module of the barcode image to construct a module map according to the mapping relationship;

(g) binarizing the module map;

(h) extracting a codeword according to a result of the binarizing step; and (i) decoding the codeword.

12. The method for decoding a Data Matrix barcode of claim 11, wherein the step of searching for a characteristic pattern to obtain a barcode parameter further comprises generating a characteristic pattern detection template according to a module dimension scale of the characteristic pattern, translating the characteristic pattern detection template relative to the barcode image, executing a grayscale matching process to determine an optimal matching position between the characteristic pattern detection template and the barcode image, and determining the pixel coordinates of the characteristic pattern in the barcode image according to the optimal matching position.

13. The method for decoding a Data Matrix barcode of claim 11, wherein the step of searching for a characteristic pattern to obtain a barcode parameter further comprises extracting from a predetermined region of the barcode image a plurality of black-white boundary line segments of a predetermined length, forming a plurality of straight lines from the plurality of black-white boundary line segments, grouping the plurality of straight lines into a row parallel line group and a column parallel line group according to characteristics of parallel lines, identifying a type of the Data Matrix barcode by making a determination on a grid formed by the row parallel line group and the column parallel line group and according to characteristics of the Data Matrix barcode, and acquiring the pixel coordinates of the characteristic pattern in the grid formed by the row parallel line group and the column parallel line group.

14. The method for decoding a Data Matrix barcode of claim 11, wherein the step of calculating module coordinates of the correction characteristic pattern according to the barcode parameter, the module parameter, and the pixel coordinates of the correction characteristic pattern further comprises obtaining an error correction level of the Data Matrix barcode according to the module parameter.

15. A method for decoding a Data Matrix barcode, comprising the following steps of:

(a) acquiring a barcode image of the Data Matrix barcode;

(b) searching for a characteristic pattern to obtain a barcode parameter and pixel coordinates of the characteristic pattern using a characteristic searching unit, wherein the characteristic searching unit detects boundary points between dark-colored modules and light-colored modules in the barcode image through scanning, compares a spacing relationship between the boundary points with a module dimension scale of the characteristic pattern, and determines the pixel coordinates of the characteristic pattern in the barcode image according to the comparison result;

(c) calculating module coordinates of the characteristic pattern according to the barcode parameter, a module parameter, and the pixel coordinates of the characteristic pattern;

(d) calculating a mapping relationship between pixel coordinates and module coordinates of the barcode image according to the pixel coordinates of the characteristic pattern and the module pixels of the characteristic pattern;

(e) calculating a module grayscale value corresponding to each module of the barcode image to construct a module map according to the mapping relationship;

(f) binarizing the module map;

(g) extracting a codeword according to a result of the binarizing step; and (h) decoding the codeword.

16. The method for decoding a Data Matrix barcode of claim 15, wherein the characteristic searching unit generates a characteristic pattern detection template according to a module dimension scale of the characteristic pattern, translates the characteristic pattern detection template relative to the barcode image, executes a grayscale matching process to determine an optimal matching position between the characteristic pattern detection template and the barcode image, and determines the pixel coordinates of the characteristic pattern in the barcode image according to the optimal matching position.

17. The method for decoding a Data Matrix barcode of claim 15, wherein the characteristic searching unit extracts from a predetermined region of the barcode image a plurality of black-white boundary line segments of a predetermined length, forms a plurality of straight lines from the plurality of black-white boundary line segments, groups the plurality of straight lines into a row parallel line group and a column parallel line group according to characteristics of parallel lines, identifies a type of the Data Matrix barcode by making a determination on a grid formed by the row parallel line group and the column parallel line group and according to characteristics of the Data Matrix barcode, and acquires the pixel coordinates of the characteristic pattern in the grid formed by the row parallel line group and the column parallel line group.

* * * * *